(12) United States Patent
Benson et al.

(10) Patent No.: US 7,960,934 B2
(45) Date of Patent: Jun. 14, 2011

(54) FAULT-TOLERANT CONTROL SYSTEM

(75) Inventors: Dwayne M. Benson, Chandler, AZ (US);
James Neil Quitmeyer, Chandler, AZ (US); William Daugherty, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 382 days.

(21) Appl. No.: 12/236,326

(22) Filed: Sep. 23, 2008

(65) Prior Publication Data

US 2010/0072934 A1    Mar. 25, 2010

(51) Int. Cl.
*G05B 9/03* (2006.01)

(52) U.S. Cl. .......... 318/564; 318/400.04; 318/603; 318/605; 318/618

(58) Field of Classification Search .......... 318/564, 318/400.04, 603, 605, 618
See application file for complete search history.

(56) References Cited

U.S. PATENT DOCUMENTS

| | | |
|---|---|---|
| 3,626,283 A | 12/1971 | James et al. |
| 3,851,238 A | 11/1974 | Fletcher et al. |
| 3,906,324 A | 9/1975 | Smith |
| 4,021,714 A | 5/1977 | Jones et al. |
| 4,109,200 A | 8/1978 | McNulty |
| 4,140,998 A | 2/1979 | Bettle |
| 4,575,666 A | 3/1986 | Nakashima et al. |
| 4,594,537 A | 6/1986 | Arifian et al. |
| 4,647,827 A | 3/1987 | Toyoda et al. |
| 4,705,996 A | 11/1987 | Harshberger, Jr. et al. |
| 4,937,577 A * | 6/1990 | Rich et al. ............ 341/143 |
| 5,025,378 A | 6/1991 | Kahler |
| 5,332,955 A | 7/1994 | Hopper |
| 5,367,237 A | 11/1994 | Ring et al. |
| 5,517,097 A * | 5/1996 | Hayashida ......... 318/568.22 |
| 5,589,749 A | 12/1996 | Davidson et al. |
| 5,760,359 A * | 6/1998 | Nakano et al. ............ 318/603 |
| 6,023,145 A | 2/2000 | Karaaslan et al. |
| 6,240,246 B1 | 5/2001 | Evans |
| 6,655,187 B1 | 12/2003 | Lehner et al. |
| 6,697,680 B2 | 2/2004 | Lin et al. |
| 6,700,345 B2 | 3/2004 | Wilkens |
| 6,791,219 B1 | 9/2004 | Eric et al. |
| 7,138,794 B1 | 11/2006 | Cook et al. |
| 2006/0145648 A1 | 7/2006 | Fujita et al. |

* cited by examiner

*Primary Examiner* — Walter Benson
*Assistant Examiner* — David S Luo
(74) *Attorney, Agent, or Firm* — Ingrassia Fisher & Lorenz, P.C.

(57) ABSTRACT

A fault-tolerant position feedback filter may be used in an actuation control system to limit the authority of a first position signal, should the first position signal become erroneous, and thereby prevent a postulated runaway condition of an acuator. The filter includes a difference function, a limited integrator, and a summer. The difference function supplies a first position error signal representative of a mathematical difference between a first position signal and a combined position signal. The limited integrator supplies an integrated position error signal that is limited in magnitude to a predetermined limit. The summer supplies the combined position error signal that is representative of a mathematical sum of the integrated position error signal and the second position signal.

20 Claims, 2 Drawing Sheets

FAULT-TOLERANT CONTROL SYSTEM

STATEMENT REGARDING FEDERALLY SPONSORED RESEARCH OR DEVELOPMENT

This invention was made with Government support under HQ-006-04-C-0004 awarded by the Missile Defense Agency. The Government has certain rights in this invention.

TECHNICAL FIELD

The present invention relates to actuator controls and, more particularly, to an actuation control system that includes a filter for accommodating certain system faults.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. No matter the particular end-use, actuation systems may be subject to relatively severe environmental conditions, as well as relatively high magnitude shock and vibration. These conditions, as well as others, may have deleterious effects on system operability. For example, it is postulated that these conditions could cause a runaway actuator condition or a jammed actuator condition.

In many instances, the direct result of a runaway or jammed actuator condition may be a faulty position sensor. More specifically, many actuators include one or more position sensors to sense actuator position and supply actuator position feedback signals to a suitable controller. If one or more of the actuators becomes faulty, or is otherwise inoperable, the actuator position sensors could supply erroneous feedback signals or no feedback signals at all. This could readily lead to a runaway or jammed actuator condition.

Hence, there is a need for an actuator control system that will prevent, or at least inhibit, the likelihood of a runaway or jammed actuator condition. In particular, there is a need for an actuator control system that will prevent, or at least inhibit, the likelihood of a runaway or jammed actuator condition resulting from a faulty, or otherwise inoperable, actuator position sensor. The present invention addresses at least this need.

BRIEF SUMMARY

In one embodiment, and by way of example only, a fault-tolerant servomechanism control includes a position control and a combined position feedback filter. The position control is coupled to receive position commands and combined position feedback signals and is operable, in response thereto, to supply output commands. The combined position feedback filter is coupled to receive a first position feedback signal and a second position feedback signal and is operable, in response thereto, to supply the combined position feedback signals to the position control. The combined position feedback filter includes a difference function, a limited integrator, and a summer The difference function is coupled to receive the first position feedback signals and the combined position feedback signals and is operable to supply first position error signals representative of a mathematical difference between the first position feedback signals and the combined position feedback signals. The limited integrator is coupled to receive the first position error signals and is operable to supply integrated position error signals that are limited in magnitude to a predetermined limit. The summer is coupled to receive the integrated position error signals and the second position feedback signals and is operable to supply the combined position feedback signals. The combined position feedback signals are representative of a mathematical sum of the integrated position error signals and the second position feedback signals.

In another embodiment, a fault-tolerant actuator control system includes an actuator, an actuator controller, and a combined position feedback filter. The actuator is coupled to receive control signals. The actuator controller is coupled to receive at least position commands and combined position feedback signals and is operable, in response thereto, to supply the actuator control signals to the actuator. The combined position feedback filter is coupled to receive first actuator position feedback signals and second actuator position feedback signals and is operable, in response thereto, to supply the combined position feedback signals to the actuator controller. The combined position feedback filter includes a difference function, a limited integrator, and a summer The difference function is coupled to receive the first actuator position feedback signals and the combined position feedback signals and is operable to supply first position error signals representative of a mathematical difference between the first actuator position feedback signals and the combined position feedback signals. The limited integrator is coupled to receive the first position error signals and is operable to supply integrated position error signals that are limited in magnitude to a predetermined limit. The summer is coupled to receive the integrated position error signals and the second actuator position feedback signals and is operable to supply the combined position feedback signals. The combined position feedback signals are representative of a mathematical sum of the integrated position error signals and the second actuator position signals.

In yet another embodiment, a fault-tolerant position feedback filter includes a difference function, a limited integrator, and a summer The difference function is coupled to receive a first position signal and a combined position error signal and is operable to supply a first position error signal representative of a mathematical difference between the first position signal and the combined position signal. The limited integrator is coupled to receive the first position error signal and operable to supply an integrated position error signal that is limited in magnitude to a predetermined limit. The summer is coupled to receive the integrated position error signal and a second position signal and is operable to supply the combined position error signal. The combined position error signal is representative of a mathematical sum of the integrated position error signal and the second position signal.

Other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
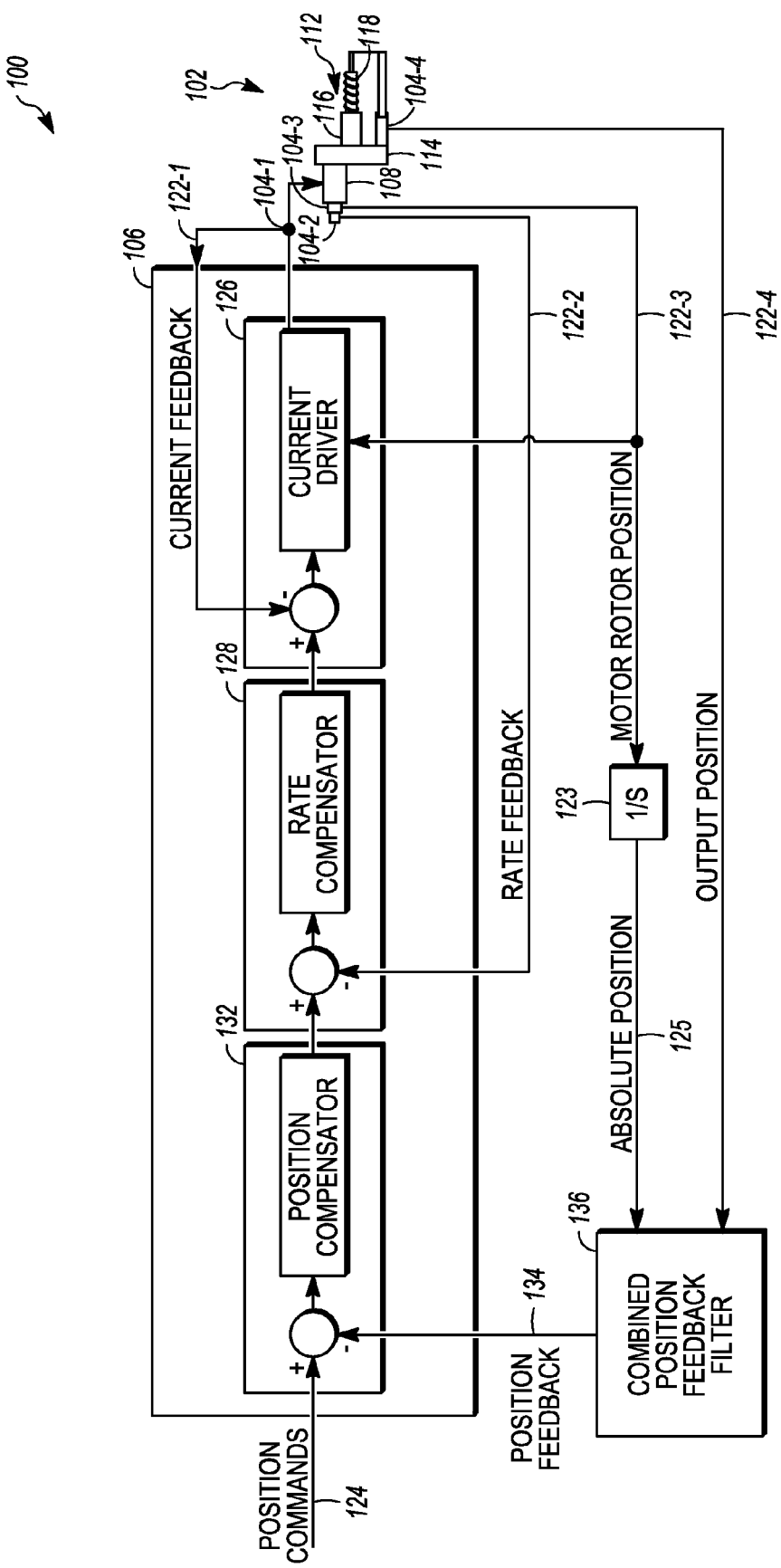
FIG. 1 depicts a functional block diagram of an exemplary servomechanism control system.

Referring to FIG. 1, a functional block diagram of a servomechanism control system 100 is depicted, and includes a servomechanism 102, a plurality of sensors 104 (e.g., 104-1, 104-2, 104-3, 104-4), and a controller 106. The servomechanism 102, at least in the depicted embodiment, is used to drive a non-illustrated load. It will be appreciated that the servomechanism 102 may be implemented as any one of numerous types of suitable devices. Some exemplary implementations include various hydraulic, pneumatic, or electric devices, just to name a few. In the depicted embodiment, however, the servomechanism 102 is an actuator assembly. No matter its particular implementation, the servomechanism 102 is controlled, via the controller 106, to supply a drive force to a load to, for example, move the load to a commanded position.

The actuator assembly 102 includes a power drive unit 108 and an actuator 112. The power drive unit 108 is preferably implemented as a motor and, at least in the depicted embodiment, is coupled to the actuator via a gearbox 114. The power drive unit 104 is preferably implemented as a motor, and may be any one of numerous types of hydraulic, pneumatic, or electric motors. In a particular preferred embodiment, the motor is an electric motor, which may be any one of numerous types of AC or DC motors now known or developed in the future including, for example, an AC induction motor or a brushed DC motor. In the depicted embodiment, however, the motor is implemented as a brushless DC motor. No matter how the motor 104 is specifically implemented, it is configured, upon being properly energized and supplied with actuation position control signals, to rotate and supply a drive torque to the actuator 112 via the gearbox 114.

In the depicted embodiment, the actuator 112 includes an actuation member 116 and a translation member 118. The actuation member 116 is coupled to receive the drive torque from the power drive unit 108 and gearbox 114. In response to the drive torque supplied from the power drive unit 108 and gearbox 114, the actuation member 116 rotates. The translation member 118 is coupled to the actuation member 116 and is configured, upon rotation thereof, to translate to a position. It may be seen that the actuation member 116 and the translation member 118, at least in the depicted embodiment, are implemented as a ballscrew assembly, in which the ballnut functions as the actuation member 116 and the ballscrew functions as the translation member 118. It will be appreciated, however, that this is merely exemplary, and that the actuation member 116 and translation member 118 could be implemented as any one of numerous assemblies that convert rotational motion into translational motion including, for example, jackscrew assemblies and rollerscrew assemblies, just to name a few. It will additionally be appreciated that the actuator 112 could be implemented as any one of numerous other types of actuators including, but not limited to, numerous types of rotary actuators and/or numerous types of linear actuators, just to name a few.

The sensors 104 are configured to sense various parameters and supply feedback signals 122 (e.g., 122-1, 122-2, 122-3, 122-4) representative of the sensed parameters to the controller 106. These sensed parameters may vary, but in the depicted embodiment, in which the servomechanism 102 is implemented as an electromechanical actuator (EMA), the sensed parameters include motor current, motor rate (e.g., motor rotor rotational rate), motor position (e.g., motor rotor rotational position), and actuator position. A motor current sensor 104-1 is configured to sense the electrical current supplied to motor 108 and supply a current feedback signal 122-1 representative thereof to the controller 106. Some non-limiting examples of suitable current sensors 104-1 that may be used include sense resistors or linear output Hall effect sensors.

The motor rate sensor 104-2 is coupled to the motor 108 and is configured to sense motor rate and supply a rate feedback signal 122-2 representative thereof to the controller 106. A non-limiting example of a suitable sensor 104-2 that may be used to sense motor rate includes a tachometer. It will additionally be appreciated that in some embodiments the rate feedback, and hence the rate sensor 104-2, may be eliminated by, for example, differentiating the motor rotor position feedback signal (described below). Moreover, in some embodiments the motor rate may be supplied from or derived from a motor position sensor 104-3, such as an incremental encoder, by means of pulse counting.

The motor position sensor 104-3 is coupled to the motor 108, and more specifically the motor rotor. Thus, when the motor 108 rotates the motor position sensor 104-3 also rotates and supplies a motor position feedback signal 122-3 representative of the rotational position of the motor 104. It will be appreciated that the motor position feedback signals 112-3 may be used, at least in some embodiments, to properly commutate the motor 108. As FIG. 1 further depicts, the motor position feedback signals 122-3 are also coupled to an integrator 123. The integrator 123 is operable to integrate the motor position feedback signals 122-3 and supply what are referred to herein as absolute position feedback signals 125. As may be readily appreciated, the absolute position feedback signals 125 are representative of the number of motor revolutions (including partial revolutions), and are thus also representative of the position of the actuator translational member 118. Some non-limiting examples of suitable sensors 104-3 that may be used to sense motor rotational position include discrete Hall effect sensors, a resolver, a synchro, or an encoder.

The actuator position sensor 104-4 is coupled to, and is configured to supply an actuator (or output) position feedback signal 122-4 representative of the position of, the translation member 118 to the controller 106. Thus, when the translation member 118 translates in response to actuation member 116 rotation, at least a portion of the actuator position sensor 104-4 translates a commensurate distance. In the depicted embodiment the actuator position sensor 104-4 is implemented using a linear variable differential transformer (LVDT) type of position sensor, though any one of numerous other types of sensors, including potentiometers and linear encoders, may also be used.

The controller 106 is coupled to receive position commands 124 and at least some of the feedback signals 122. The position commands 124 may be supplied from any one of numerous non-illustrated external components or systems. The controller 106, in response to the position commands 124 and the feedback signals 122, controllably energizes the motor 108 from a non-illustrated power source to move the actuator 112, and thus a non-illustrated component coupled to the actuator 112, to the commanded position. In the depicted embodiment, the controller 106 implements this functionality via a current control 126, a rate control 128, and a position control 132. It is noted, however, that in some embodiments the controller 106 could, if needed or desired, be implemented without the rate control 128 and/or current control 132, as these are conventional technologies.

The current control 126 is coupled to receive current commands from the rate control 128, and is further coupled to receive the current feedback signals 122-1 and the motor position signals 122-3. The current control 126 is operable, in response to these signals, to controllably commutate and energize the phase windings of the motor 108 to move a load, via the actuator 112, to the commanded position. The rate control 128 is coupled to receive rate commands from the position control 132, and is further coupled to receive the rate feedback signals 122-2. The rate control 128 is operable, in response to these signals, to supply the current commands to the current control 126. The position control 126 is coupled to receive the position commands 124 and combined position feedback signals 134 from a combined position feedback filter 136. The position control 126 is operable, in response to these signals, to supply the rate commands to the rate control 128.

Figure 2:
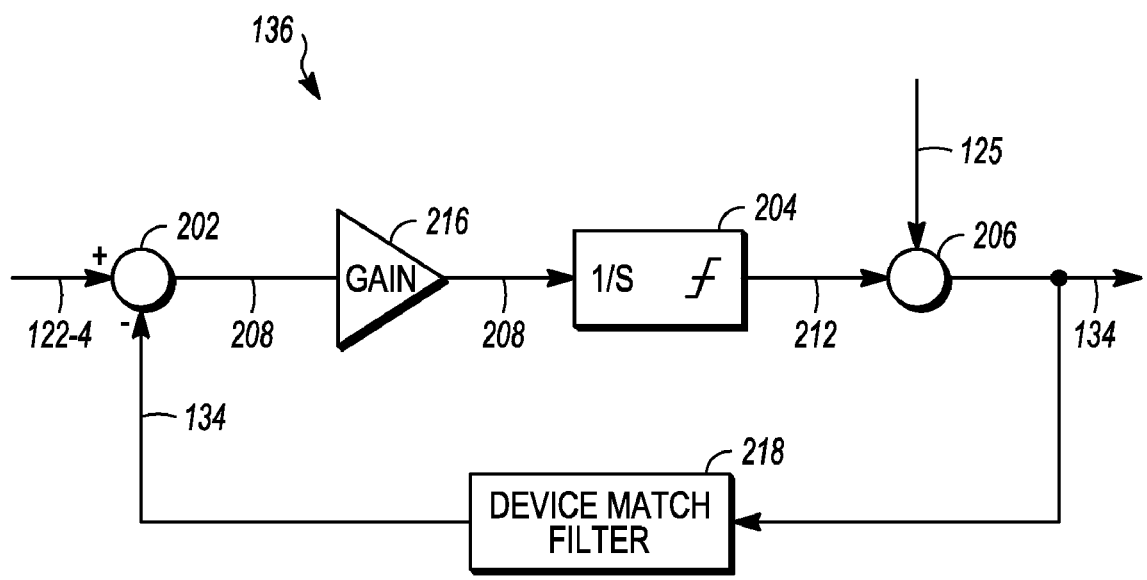
FIG. 2 depicts a functional block diagram of an exemplary combined position feedback filter that may be used to implement the exemplary servomechanism control system of FIG. 1.

It will be appreciated that the position control 126, the rate control 128, and the current control 132 may each be implemented using any one of numerous suitable controls, now known or developed in the future. A detailed description of the position 126, rate 128, and current 132 controls is not needed to fully describe or enable the invention, and as such will not be further described. However, a particular preferred embodiment of the combined position feedback filter 136 is depicted in FIG. 2 and will now be described. Before doing so, it is noted that the current control 126, rate control 128, the position control 132, and the combined position feedback filter 136 could be implemented using software, firmware, analog hardware devices, or various combinations thereof. Moreover, although FIG. 1 depicts the combined position feedback filter 136 as being implemented apart from the controller 106, it could alternatively be implemented within the controller 106.

Turning now to FIG. 2, it is seen that the combined position feedback filter 136 includes a difference function 202, a limited integrator 204, and a summer 206. The difference function is coupled to receive first position signals, which in the depicted embodiment are the actuator position feedback signals 122-4, and the combined position feedback signals 134. The difference function 202 is operable, in response to these signals, to supply first position error signals 208 representative of a mathematical difference between the first position signal 122-4 and the combined position feedback signals 134. The first position error signals 208 are supplied to the limited integrator 204.

The limited integrator 204 is coupled to receive the first position error signals 208 from the difference function 202. The limited integrator 204 is operable to integrate the first position error signals 208 and supply integrated position error signals 212. The limited integrator 204, as its nomenclature connotes, is also operable to implement a limiter function that limits the magnitude of the integrated position error signals 212 to a predetermined limit. The predetermined limit may be set via software or hardware, depending on the configuration of the limited integrator 204, and is preferably set to a value that is less than or equal to the maximum amount of position error that is tolerable in the system 100. No matter the particular value to which the limited integrator 204 is set, the integrated position error signals 212 are supplied to the summer 206.

The summer 206 is coupled to receive the integrated position error signals 212 from the limited integrator 204. As FIG. 2 also depicts, the summer 206 is also coupled to receive second position signals, which in the depicted embodiment are the absolute position feedback signals 125. The summer 206 is operable, in response to these signals, to supply the combined position error signals 134, which are representative of a mathematical sum of the integrated position error signals 212 and the absolute position feedback signals 125.

The combined position feedback filter 136 may optionally include, either or both, a gain 216 and a device match filter 218. The gain 216, if included, is coupled between the difference function 202 and the limited integrator 204. The gain 216 receives the first position error signals 208 and is operable to amplify the first position error signals 208 and supply amplified first position error signals to the limited integrator 204. The device match filter 218, if included, is coupled in the feedback path between the summer 206 and the difference function 202. The device match filter 218 is thus coupled to receive the combined position error signals 134 from the summer 206 and is operable to filter the combined position error signals 134 and supply filtered combined position error signals to the difference function 202. More specifically, the device match filter 218 is configured to mimic the dynamics of the actuator position sensor 104-4 and prevents, or at least inhibits, any transients in the combined position error signals 134 from being supplied back to the difference function 202.

With the above-described combined position feedback filter 136 configuration, if the first position signal signals (i.e., the output position signals 122-4 from the actuator position sensor 104-4) become errant, the error in the combined position feedback signals 134 is limited to the value of the predetermined limit set in the limited integrator 204. This assumes, of course, that the second position signals (i.e., the absolute position signals 125 from the motor position sensor 104-3) are correct. However, for embodiments in which the power drive unit 108 is implemented as an electric motor, if the second position signals are erroneous beyond a tolerable value, the controller 106 will not properly commutate the motor 108, and the motor 108 will not rotate. It will be appreciated by those skilled in the art that postulated common-mode failures of the actuator position sensor 104-4 can lead to a runaway condition of the actuator 102.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fault-tolerant servomechanism control, comprising:
  a position control coupled to receive position commands and combined position feedback signals and operable, in response thereto, to supply commands; and
  a combined position feedback filter coupled to receive a first position feedback signal and a second position feedback signal and operable, in response thereto, to supply the combined position feedback signals to the position control, the combined position feedback filter comprising:
    a difference function coupled to receive the first position feedback signals and the combined position feedback signals and operable to supply first position error signals representative of a mathematical difference between the first position feedback signals and the combined position feedback signals,
a limited integrator coupled to receive the first position error signals and operable to supply integrated position error signals that are limited in magnitude to a predetermined limit, and
a summer coupled to receive the integrated error signals and the second position feedback signals and operable to supply the combined position feedback signals, the combined position feedback signals representative of a mathematical sum of the integrated error signals and the second position feedback signals.

2. The control of claim 1, wherein the commands supplied from the position control are rate commands, and wherein the control further comprises:
a rate control coupled to receive the rate commands and rate feedback signals and operable, in response thereto, to supply commands.

3. The control of claim 2, wherein the commands supplied from the rate control are current commands, and wherein the control further comprises:
a current control coupled to receive the current commands and current feedback signals and operable, in response thereto, to supply motor commutation control signals.

4. The control of claim 1, wherein the combined position feedback filter further comprises:
a gain coupled between the difference function and the limited integrator, the gain coupled to receive the first error signal and operable to supply an amplified first error signal to the limited integrator.

5. The control of claim 1, wherein the combined position feedback filter further comprises:
a device match filter coupled between the summer and the difference function, the device match filter coupled to receive the combined position error signal from the summer and operable to filter the combined position error signal and supply a filtered combined position error signal to the difference function.

6. A fault-tolerant actuator control system, comprising:
an actuator assembly coupled to receive control signals;
an actuator controller coupled to receive at least position commands and combined position feedback signals and operable, in response thereto, to supply the actuator control signals to the actuator assembly; and
a combined position feedback filter coupled to receive first actuator position feedback signals and second actuator position feedback signals and operable, in response thereto, to supply the combined position feedback signals to the actuator controller, the combined position feedback filter comprising:
a difference function coupled to receive the first actuator position feedback signals and the combined position feedback signals and operable to supply first position error signals representative of a mathematical difference between the first actuator position feedback signals and the combined position feedback signals,
a limited integrator coupled to receive the first position error signals and operable to supply integrated position error signals that are limited in magnitude to a predetermined limit, and
a summer coupled to receive the integrated position error signals and the second actuator position feedback signals and operable to supply the combined position feedback signals, the combined position feedback signals representative of a mathematical sum of the integrated position error signals and the second actuator position signals.

7. The system of claim 6, further comprising:
a first position sensor coupled to the actuator and operable to supply the first actuator position signal to the combined position feedback filter;
a second position sensor coupled to the actuator and operable to supply the second actuator position signal to the combined position feedback filter.

8. The system of claim 7, wherein:
the actuator assembly comprises a motor and an actuator;
the first position sensor comprises a motor position sensor; and
the second position sensor comprises an actuator position sensor.

9. The system of claim 8, wherein:
the motor comprises an electric motor; and
the motor position sensor comprises a rotational position sensor.

10. The system of claim 9, further comprising:
an integrator coupled between the rotational position sensor and the combined position feedback filter.

11. The system of claim 10, wherein the commands supplied from the position control are rate commands, and wherein the controller further comprises:
a rate control coupled to receive the rate commands and rate feedback signals and operable, in response thereto, to supply commands.

12. The system of claim 11, further comprising:
a rate sensor coupled to the actuator and operable to sense actuator movement rate and supply the rate feedback signals.

13. The system of claim 11, wherein the commands supplied from the rate control are current commands, and wherein the controller further comprises:
a current control coupled to receive the current commands and current feedback signals and operable, in response thereto, to supply motor commutation control signals.

14. The system of claim 13, further comprising:
a current sensor operable to sense motor current and supply the current feedback signals.

15. The system of claim 6, wherein the controller comprises:
a position control coupled to receive the position commands and the combined position feedback signals and operable, in response thereto, to supply commands.

16. The system of claim 6, wherein the combined position feedback filter further comprises:
a gain coupled between the difference function and the limited integrator, the gain coupled to receive the first error signal and operable to supply an amplified first error signal to the limited integrator.

17. The system of claim 6, wherein the combined position feedback filter further comprises:
a device match filter coupled between the summer and the difference function, the device match filter coupled to receive the combined position error signal from the summer and operable to filter the combined position error signal and supply a filtered combined position error signal to the difference function.

18. A fault-tolerant position feedback filter, comprising:
a difference function coupled to receive a first position signal and a combined position error signal and operable to supply a first error signal representative of a mathematical difference between the first position signal and the combined position signal;

a limited integrator coupled to receive the first position error signal and operable to supply an integrated position error signal that is limited in magnitude to a predetermined limit;

a summer coupled to receive the integrated position error signal and a second position signal and operable to supply the combined position error signal, the combined position error signal representative of a mathematical sum of the integrated error signal and the second position signal.

19. The filter of claim 18, further comprising:

a gain coupled between the difference function and the limited integrator, the gain coupled to receive the first error signal and operable to supply an amplified first error signal to the limited integrator.

20. The filter of claim 18, further comprising:

a device match filter coupled between the summer and the difference function, the device match filter coupled to receive the combined position error signal from the summer and operable to filter the combined position error signal and supply a filtered combined position error signal to the difference function.

* * * * *